US012512612B2

(12) United States Patent
Visneski et al.

(10) Patent No.: US 12,512,612 B2
(45) Date of Patent: Dec. 30, 2025

(54) CABLE TERMINATION CONNECTION ASSEMBLY

(71) Applicant: Cisco Technology, Inc., San Jose, CA (US)

(72) Inventors: Jason Visneski, San Jose, CA (US); George Curtis, San Jose, CA (US); Mike Sapozhnikov, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 202 days.

(21) Appl. No.: 18/448,279

(22) Filed: Aug. 11, 2023

(65) Prior Publication Data

US 2025/0055208 A1 Feb. 13, 2025

(51) Int. Cl.
*H01R 12/58* (2011.01)
*H01R 12/53* (2011.01)

(52) U.S. Cl.
CPC ........... *H01R 12/585* (2013.01); *H01R 12/53* (2013.01)

(58) Field of Classification Search
CPC .............................. H01R 12/585; H01R 12/53
USPC .......................................................... 174/250
See application file for complete search history.

(56) References Cited

U.S. PATENT DOCUMENTS 3,924,916 A * 12/1975 Venaleck ............... H01R 31/02 439/687
4,811,168 A * 3/1989 Chesnut ............... H05K 7/1417 361/752
10,985,479 B2 4/2021 Buck et al.
11,482,802 B2 10/2022 Visneski et al.
2004/0242072 A1* 12/2004 Kumamoto ........ H01R 13/6585 439/607.05
2006/0240700 A1* 10/2006 Tadokoro ............. H01R 12/675 439/387
2010/0009571 A1 1/2010 Scherer et al.
2010/0227503 A1 9/2010 Liu et al.
2012/0052699 A1 3/2012 Macdougall
2018/0261936 A1 9/2018 Kawate
2019/0267732 A1* 8/2019 Buck .................... H01R 43/205
2021/0091496 A1 3/2021 Cartier, Jr. et al.
2022/0181807 A1 6/2022 Visneski et al.
2022/0224057 A1* 7/2022 Diaz .................. H01R 13/6591

FOREIGN PATENT DOCUMENTS

KR 102059929 B1 12/2019

OTHER PUBLICATIONS

Partial International Search Report for counterpart International Application No. PCT/US2024/040899, mailed Nov. 19, 2024, 12 pages.

* cited by examiner

*Primary Examiner* — Andargie M Aychillhum
(74) *Attorney, Agent, or Firm* — Edell, Shapiro & Finnan, LLC

(57) ABSTRACT

In some aspects, the techniques described herein relate to an apparatus including: a cable termination connection assembly, comprising: a base including a body defining a groove therein; a signal contact member that is engageable with the base, at least a portion of the signal contact member being insertable into the groove of the body of the base, the signal contact member including pins extending therefrom; and a cover that is engageable with the signal contact member, wherein the cover can be pressed by a user to cause the pins to extend through the base and engage a PCB.

20 Claims, 12 Drawing Sheets

CABLE TERMINATION CONNECTION ASSEMBLY

TECHNICAL FIELD

The present disclosure relates to a press-fit termination for a cable or wire, and particularly to press-fit termination for a cable or wire that is useable with a printed circuit board (PCB).

BACKGROUND

In high speed interconnects, a twin-ax cable or wire is used instead of a trace in a PCB. In related art cable or wire interconnects, a cable is terminated to one piece of a two piece pluggable connector, with the other half of the connector mounted on the PCB. The overall height of the pluggable connector is too high for many applications and system. In addition, if the interconnect design does not need to be pluggable, extra material is being used and extra costs are being incurred. In related art interconnects, the interconnects lack the mechanical reliability and lack a desired interconnect density.

DETAILED DESCRIPTION

Overview

Figure 1:
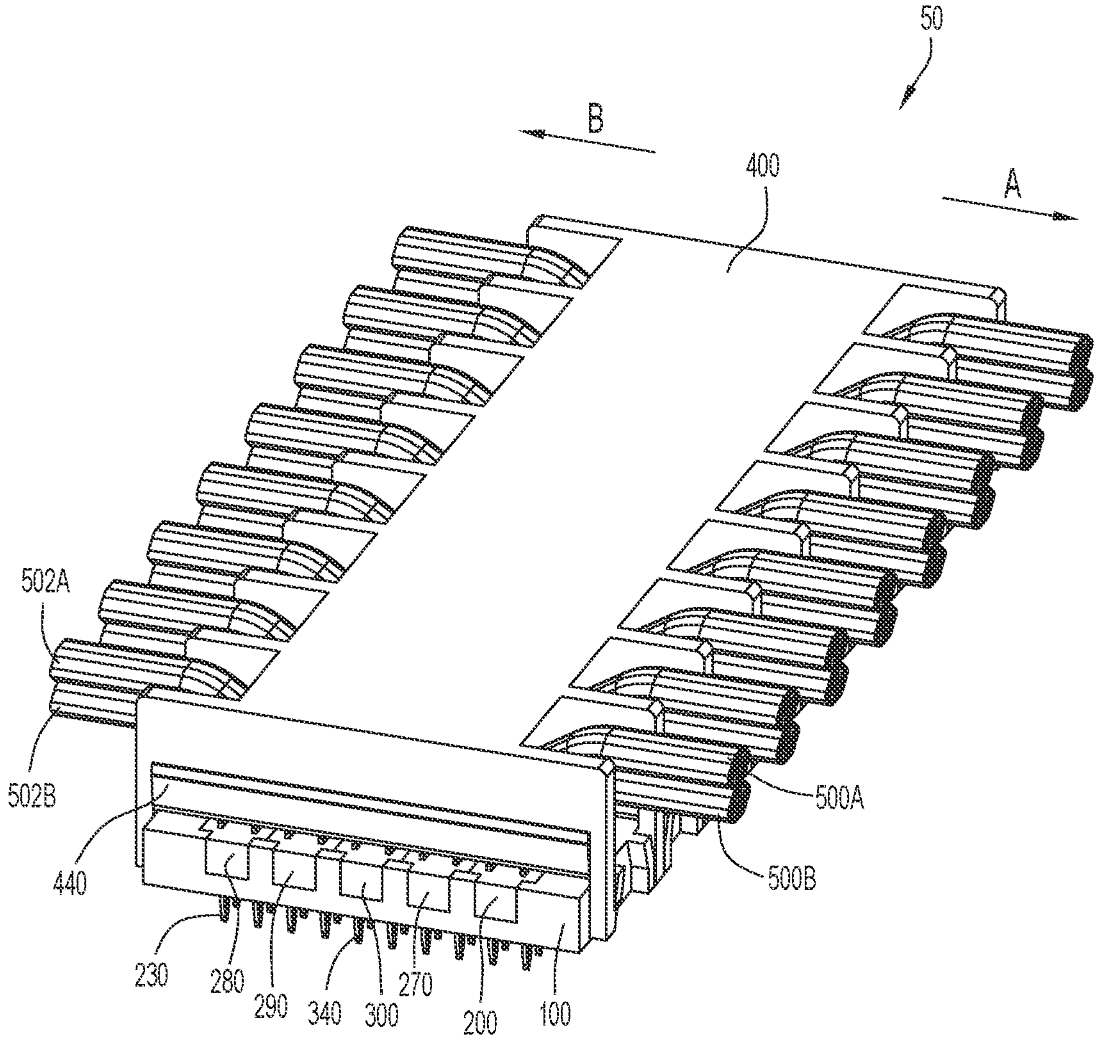
FIG. 1 is an upper perspective view of a cable or wire termination connection assembly that includes components of the techniques disclosed herein, according to an example embodiment.

In some aspects, the techniques described herein relate to an apparatus including: a cable or wire termination connection assembly, comprising: a base including a body defining a groove therein; a signal contact member that is engageable with the base, at least a portion of the signal contact member being insertable into the groove of the body of the base, the signal contact member including pins extending therefrom; and a cover that is engageable with the signal contact member, wherein the cover can be pressed by a user to cause the pins to extend through the base and engage a PCB.

In some aspects, the techniques described herein relate to an apparatus including: a cable or wire termination connection assembly, comprising: a base including a body, the body defining a first groove and a second groove; a first signal contact member engageable with the base, the first signal contact member being insertable into the first groove of the body of the base, the first signal contact member including pins extending therefrom; a second signal contact member engageable with the base, the second signal contact member being insertable into the second groove of the body of the base, the second signal contact member including pins extending therefrom; and a cover having a first engaging surface and a second engaging surface spaced apart from the first engaging surface, each of the first engaging surface and the second engaging surface being engageable with the first signal contact member and the second signal contact member, wherein the cover can be pressed by a user to move the first signal contact member and the second signal contact member into engagement with the base.

In some aspects, the techniques described herein relate to an apparatus including: a cable or wire termination connection assembly, comprising: a base including a body defining a plurality of grooves; a plurality of signal contact members engageable with the base, each signal contact member being insertable into one of the grooves of the body of the base, each signal contact member including pins extending therefrom; an elongate member engageable with the base, the elongate member being insertable into of the grooves of the body of the base, the elongate member includes a plurality of ground shield members coupled thereto; and a cover having a plurality of engaging surfaces, each of the engaging surfaces being engageable with the signal contact members and with the elongate member, wherein a force applied by a user to the cover moves the signal contact members and the elongate member toward the base so that the pins engage a PCB.

Example Embodiments

A cable or wire interconnect or termination connection assembly that has a low profile and provides sufficient points of connection for a quantity of cables or wires would have great benefits.

Example embodiments are provided for cable or wire interconnects or termination connection assemblies. The example embodiments provide a low profile and an efficient use of space for the termination connection assembly. In addition, the example embodiment of the termination connection assembly provides a modular assembly that facilitates repair and replacement of portions thereof, without requiring the replacement of all of the components. The termination connection assembly includes several signal connect members that are press-fit into grooves in a base, which provides a secure mounting to enable the press-fit pins to engage with a PCB.

In a first example embodiment of a cable termination connection assembly according to the techniques disclosed herein, the cable termination connection assembly provides a high density, high speed twin-ax wire or cable press-fit termination. In one example embodiment, the cable termination connection assembly can be installed on a bottom side of a PCB, and in particular, on a bottom side of a PCB underneath an application-specific integrated circuit (ASIC).

In another example embodiment according to the disclosed techniques, the cable termination connection assembly may terminate a large quantity of cable interconnects with high signal integrity performance and mechanical reliability at a low cost. In another example embodiment according to the disclosed techniques, the cable termination connection assembly is modular, thereby allowing the quantity of cables to be adjusted.

In yet another example embodiment according to the disclosed techniques, the cable termination connection assembly may include one or more signal contact rows or member. The signal contact row or member may include one or more press-fit pins and one or more wire or cable terminations. In addition, the cable termination connection assembly may include a base that is configured to hold multiple rows of signal contact members. In addition, the cable termination connection assembly may include an elongate member that has two sets of opposing ground shield members coupled thereto that provide isolation of transmit and receive pairs of cable terminations. Also, the cable termination connection assembly may include a top or cover that provide protection for the twin-ax pairs and wire terminations. In one disclosed technique, a press-fit tool can be used to press onto the top or cover.

Turning to FIG. 1, an upper perspective view of an example embodiment of a cable or cable termination connection assembly that includes components of the disclosed techniques disclosed is illustrated. The terms "cable termination connection assembly" and "wire termination connection assembly" are used interchangeably herein, and can be referred to also as a "termination connection assembly." The termination connection assembly can be referred to as a high density, high speed twin-ax wire press-fit termination.

In this example embodiment, the cable termination connection assembly 50 includes several components that are connectable together as described in detail below. The connectability and removability of the components enables the termination connection assembly 50 to be modular in nature, which allows for the replacement of a particular component to be made without requiring the rest of the components to be discarded. As a result, repair and replacement of particular components of the termination connection assembly is easy and economical, and utilizes material and components efficiently.

It is to be understood that the shape and size of the termination connection assembly 50 is exemplary only, and that in different embodiments, its shape and size can vary. In addition, termination connection assembly 50 being illustrated with 32 cable termination connections, which are described in detail below, is only exemplary, and in different embodiments, the quantity and location of cable termination connections can vary.

In this embodiment, termination connection assembly 50 includes a base 100, multiple signal contact members 200, 270, 280, and 290, an elongate member or elongate shield member 300, and a top or cover 400. The features of termination connector assembly 50 are illustrated and discussed in detail below. It is to be understood that each of the signal contact members 270, 280, and 290 has similar features to those of signal contact member 200. Accordingly, the description of signal contact member 200 applies to each of the signal contact members 270, 280, and 290 as well.

Referring to FIG. 1, the cover 400 is coupleable to the base 100. Each of the signal contact members 200, 270, 280, and 290 and the elongate member 300 is engageable with the base 100, and located between the cover 400 and the base 100 when the cable termination connector assembly 50 is assembled. The cover 400 includes an engaging portion 440 that is coupled to the lower side of the cover 400. The engaging portion 440 contacts the base 100, each of the signal contact members 200, 270, 280, and 290, and the elongate member 300. When a force is applied to the cover 400 via a tool, such as a press-fit tool, or directly by a user, the engaging portion 440 of the cover 400 in turn applies that force to the signal contact members 200, 270, 280, and 290 and to the elongate member 300. That force presses the signal contact members 200, 270, 280, and 290 and the elongate member 300 into a tight and secure engagement with grooves formed in the base 100.

Each of the signal contact members 200, 270, 280, and 290 includes pins 230, such as press-fit pins, extending downwardly therefrom. Similarly, the elongate member 300 includes pins 340, such as press-fit pins, extending downwardly therefrom. The pins 230 and 340 are configured to engage with a PCB.

The cable termination connection assembly 50 can have several cables connected thereto. In FIG. 1, the termination ends of several sets of cables are illustrated. On each side of the termination connection assembly 50 are two rows of cables. An upper row of cables 500A and a lower row of cables 500B are illustrated on one side of the termination connection assembly 50. Similarly, on the other side of the termination connection assembly 50 is an upper row of cables 502A and a lower row of cables 502B. In this example embodiment, each of the cables 500A. 500B, 502A, and 502B is similarly structured.

The row of cables 500A and the row of cables 500B extend away from the termination connection assembly 50 along the direction of arrow "A." The row of cables 502A and the row of cables 502B extend away from the termination connection assembly 50 along the direction of arrow "B," which is oriented opposite to the direction of arrow "A." By directing the cables 500A, 500B, 502A, and 502B in opposite directions, the height of the termination connection assembly 50 can be kept low, thereby allowing the termination connection assembly 50 to be used in smaller dimension applications. In addition, the stacking-like arrangement of the cables also enables the reduction in the overall height of the termination connection assembly 50.

Figure 2:
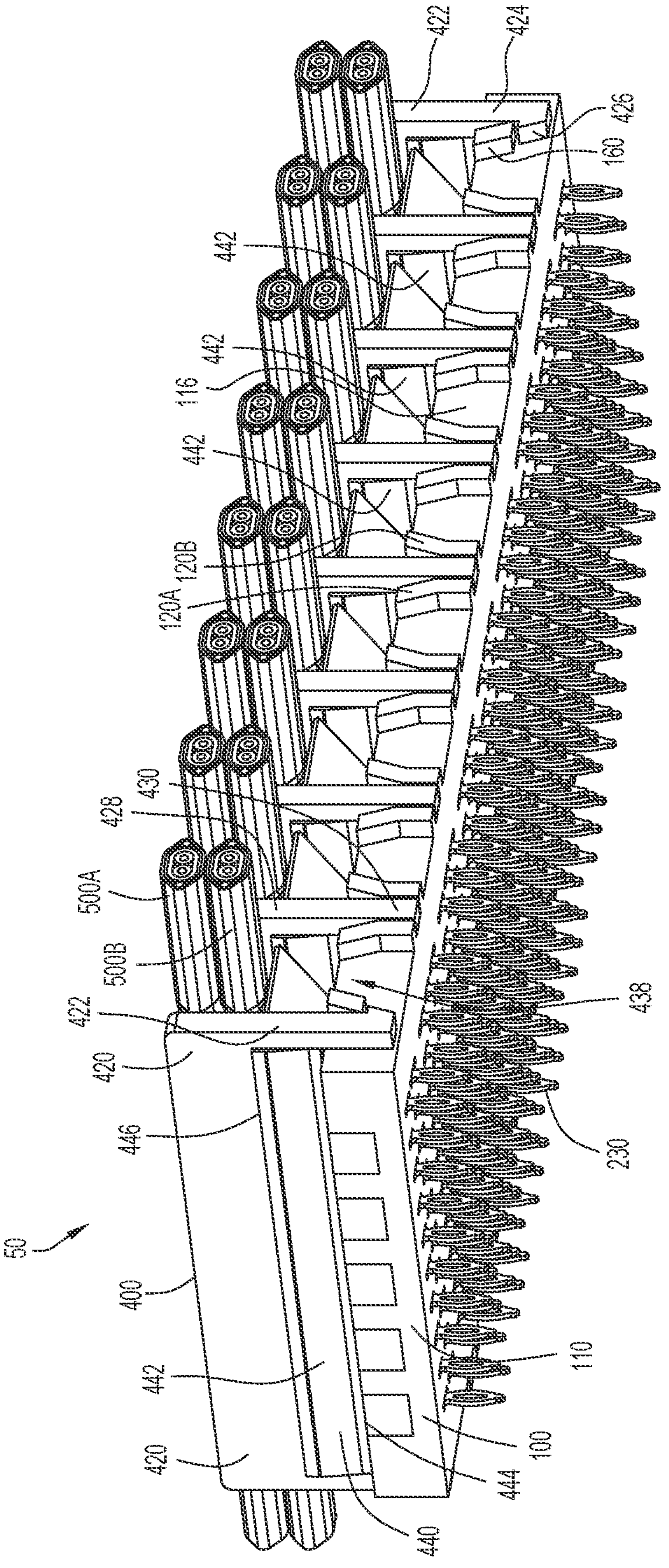
FIG. 2 is a lower perspective view of the cable termination connection assembly illustrated in FIG. 1, according to an example embodiment.

Turning to FIG. 2, a lower perspective view of the example embodiment of the termination connection assembly illustrated in FIG. 1 is shown. The relative positions of the cables 500A and 500B are shown. The engaging portion 440 of the cover 400 is located on the lower side of the cover 400. In this embodiment, the engaging portion 440 includes an engaging surface 444 that contacts each of the signal contact members 200, 270, 280, 290, and the elongate member 300. The cover 400 has several spaced apart engaging members 442, each of which has an engaging surface 444 and an upper surface 446 opposite to engaging surface 444. In this embodiment, the engaging members 442 are U-shaped channel members that have an upper surface 446 and a lower engaging surface 444.

The cover 400 of the cable termination connection assembly 50 includes opposite side portions 420 that are mirror images of each other. Referring to the side portion 420 fully shown in FIG. 2, side portion 420 includes several extending portions or members along its length. In the orientation of the termination connection assembly 50 shown in FIG. 2, the extending portions are oriented in a downward direction. In this embodiment, the side portion 420 includes two end extending portions 422 that are located at opposite ends of side portion 420. Each end extending portion 422 includes an end 424 with a tab 426 extending from one side thereto. In this example embodiment, each side portion 420 also includes seven interior extending portions 428 with lower ends 430, none of which has an outwardly extending tab 426. The end extending portions 422 and the interior extending portions 428 are spaced apart along the cover 400, thereby forming spaces 438 therebetween. The other side portion 420 of the cover 400 also has similarly structured end extending portions and interior extending portions.

The base 100 includes a body 110 that has several surfaces or sides, which are described in detail below. In FIG. 2, outer side surface 116 of the body 110 of the base 100 is shown. Formed along the outer side surface 116 are several sets of guides or rails, each of the sets including a guide 120A and a guide 120B spaced apart from guide 120A. Each set of guide 120A and guide 120B defines a space or channel into which the end 430 of an interior extending portion 428 of the cover 400 is inserted. Also formed at opposite ends of the outer side surface 116 are catches 160 that protrude outwardly from the surface 116. As shown in FIG. 2, the extending tab 426 of the end 424 engages with one of the catches 160. When the tab 426 is located on the lower surface of a catch 160, the cover 400 is secured to and prevented from moving away from the base 100. The base 100 includes a catch 160 in each of its four corners.

Figure 3:
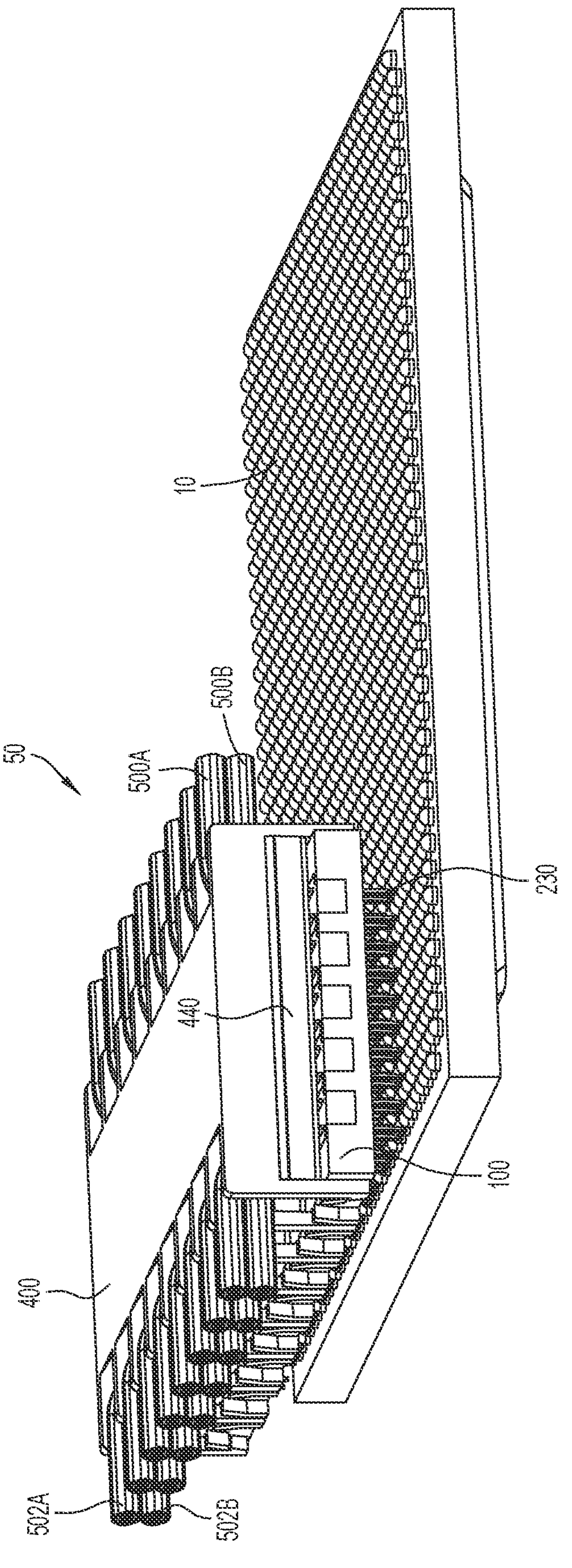
FIG. 3 is a perspective view of the cable termination connection assembly illustrated in FIG. 1 mounted to a PCB, according to an example embodiment.

Referring to FIG. 3, a perspective view of the cable termination connection assembly 50 mounted to a PCB 10. Extending downward from the base 100 are the press-fit pins 230, which are inserted into openings in the PCB 10 to make the desired connections. The cover 400 with its engaging portion 440 is coupled to the base 100. The different sets of cables 500A and 500B and of cables 502A and 502B extend in opposite directions relative to the cover 400 and the base 100.

Figure 4:
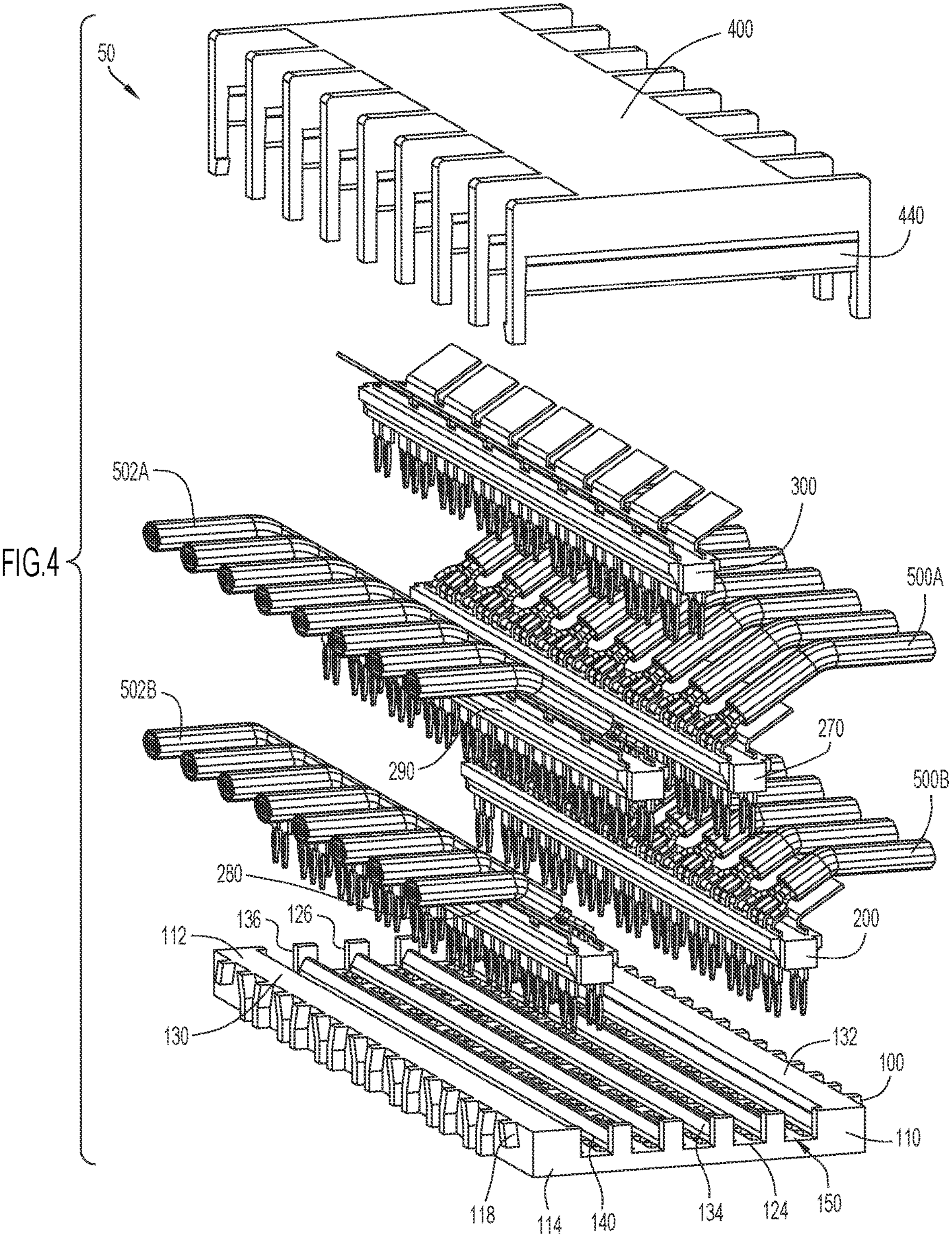
FIG. 4 is an exploded perspective view of the cable termination connection assembly illustrated in FIG. 1, according to an example embodiment.

Turning to FIG. 4, an exploded perspective view of the cable termination connection assembly 50 is illustrated. In this spaced apart perspective view, the various components of the termination connection assembly 50 are shown. The top or cover 400 includes its engaging portion 440 and the various extending portions on opposite sides of the body of the cover 400. Beneath the cover 400 is the elongate member 300, which includes opposing rows of shields coupled thereto, as described below.

The base 100 of the termination connection assembly 50 is also shown. The base 100 has a body 110 an upper surface 112 and an opposite lower surface 114. The body 110 also includes opposite outer sides or side surfaces, only side surface 118 is illustrated in FIG. 4, and opposite ends 124 and 126. In this example embodiment, the body 110 has several grooves formed in it. In particular, the body 110 has opposite outer rails 130 and 132 and several smaller or thinner inner rails 134. At the opposite ends of the inner rails 134 are shoulders 136. The height of the inner rails 134 is smaller than the height of the shoulders 136.

The grooves, only groove 140 is labeled in FIG. 4, are formed between the outer rails 130 and 132 and the inner rails 134. In this embodiment, the base 100 includes five grooves formed therein. In each of the grooves, several openings 150 are formed therein and through the body 110 of the base 100. The openings 150 are sized to receive the press-fit pins 230 therethrough.

In this embodiment, the termination connection assembly 50 includes four signal contact members 200, 270, 280, and 290. Signal contact member 200 has the row of cables 500B connected thereto, signal contact member 270 has the row of cables 500A connected thereto, signal contact member 280 has the row of cables 502B connected thereto, and signal contact member 290 has the row of cables 502A connected thereto. The downwardly directed pins of each of the signal contact members 200, 270, 280, and 290 are oriented toward the base 100.

Figure 5:
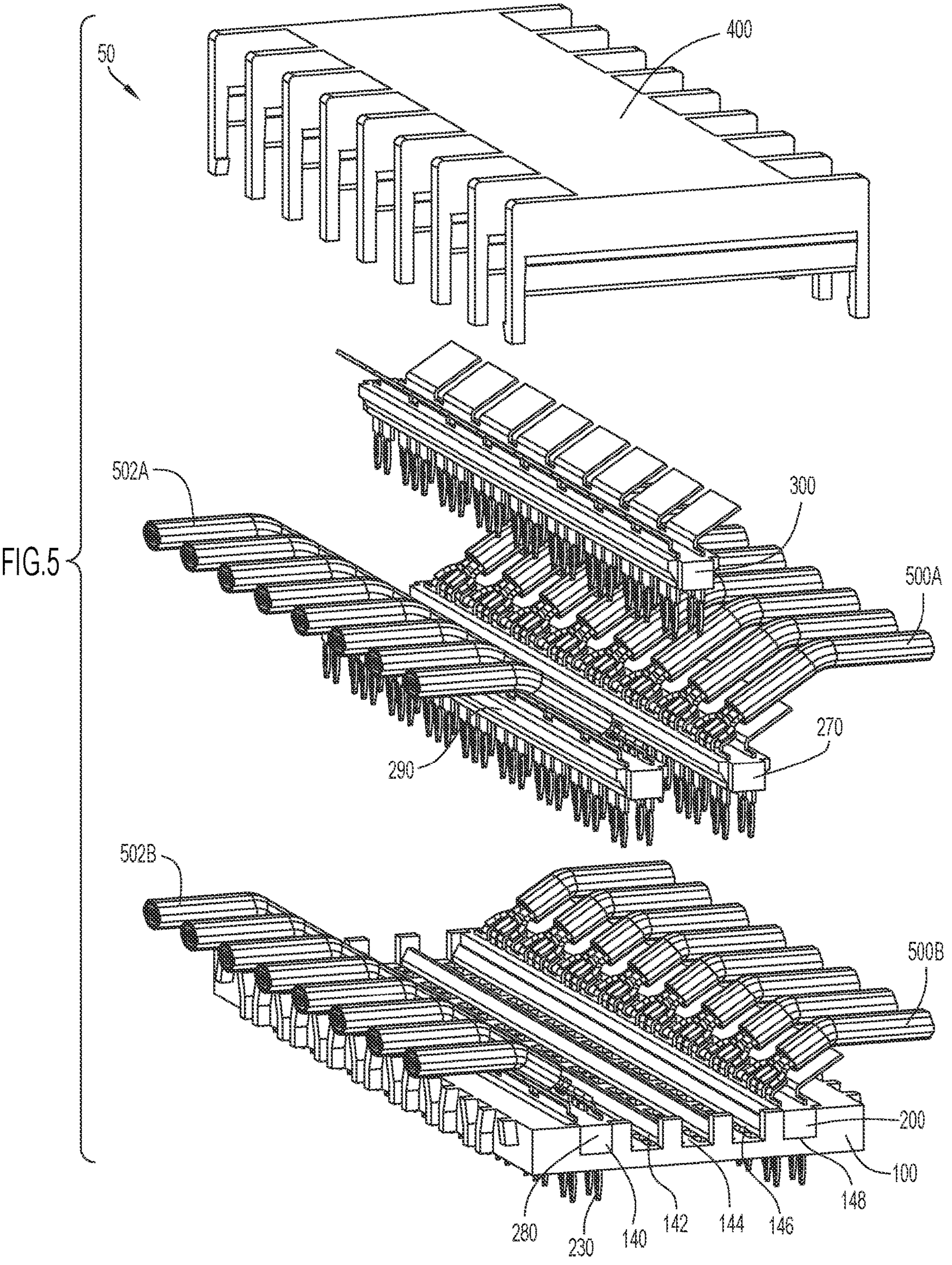
FIG. 5 is a partially exploded perspective view of the cable termination connection assembly illustrated in FIG. 4 with some components coupled together implementing the disclosed techniques, according to an example embodiment.

In FIG. 5, some of the components of the cable termination connection assembly 50 are assembled in this perspective view according to the disclosed techniques. The various grooves in the base 100 include a center groove 144, a pair of grooves 140 and 142 on one side of the center groove 144, and another pair of grooves 146 and 148 on the other side of the center groove 144. Signal contact member 200 is inserted into groove 148 and signal contact member 280 is inserted into groove 140. When the signal contact members 200 and 280 are in grooves 148 and 140, respectively, the press-fit pins 230 extending downwardly therefrom are inserted into the openings 150 and extend downwardly below the lower surface of the base 100.

Figure 6:
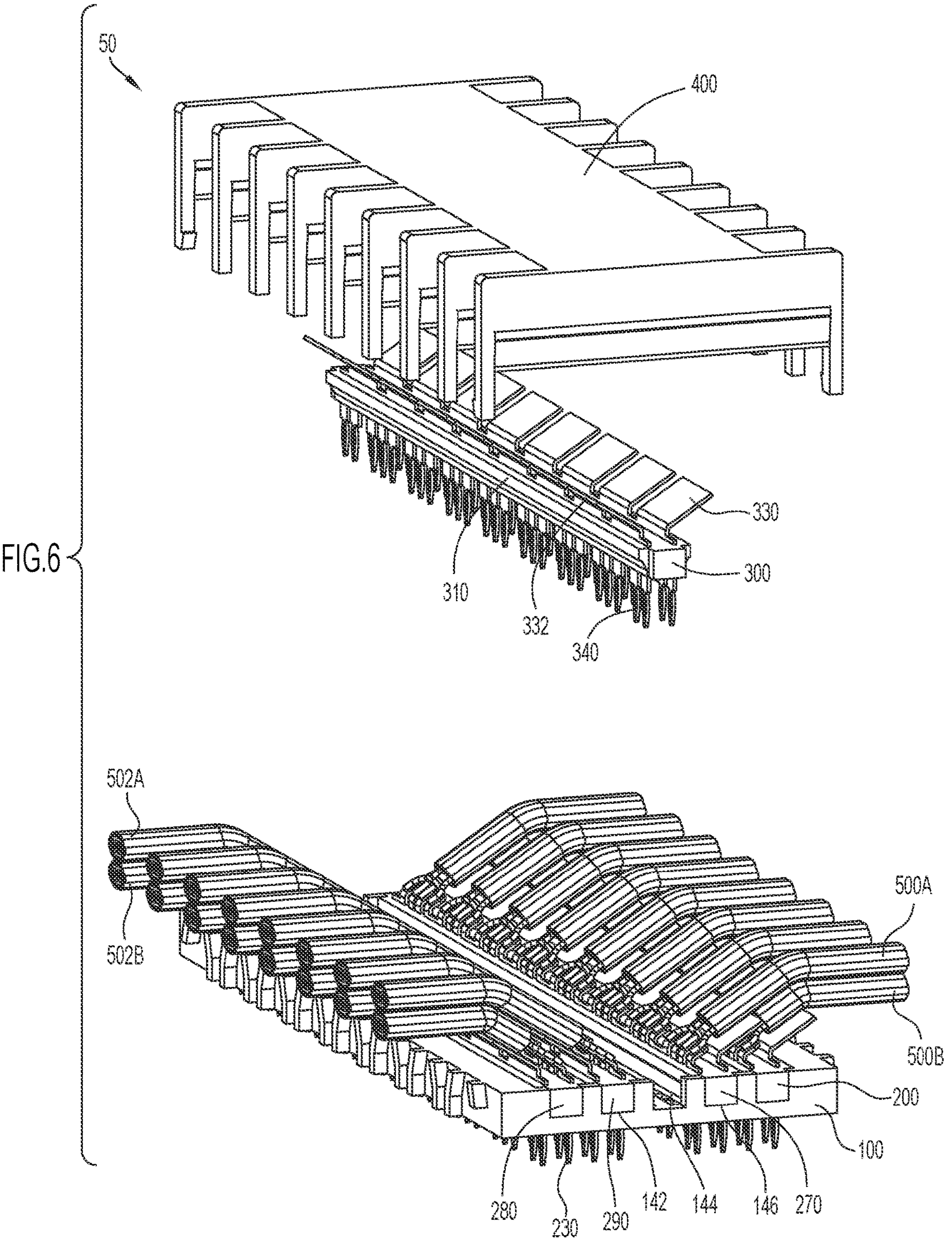
FIG. 6 is a partially exploded perspective view of the cable termination connection assembly illustrated in FIG. 4 with some components coupled together implementing the disclosed techniques, according to an example embodiment.

Referring to FIG. 6, additional components of the cable termination connection assembly 50 are assembled in this perspective view. In this configuration, signal contact member 270 is inserted into groove 146 and signal contact member 290 is inserted into groove 142. When the signal contact members 270 and 290 are in grooves 146 and 142, respectively, the press-fit pins 230 extending downwardly therefrom are inserted into the openings 150 and extend downwardly below the lower surface of the base 100.

Some of the features of the elongate member 300 are also illustrated in FIG. 6. In this example embodiment, the elongate member 300 includes a body 310 with opposite ends and opposite sides. Each of the ends and sides has a protruding portion, similar to those of the signal contact members 200, 270, 280, and 290, which are described in detail below. Formed in the upper surface of the elongate member 300 along each of the opposite sides thereof are slots. Mounted in each of the slots is a lower portion of a ground shield member. A row of ground shield members 330 are located along one side of the upper surface of the elongate member 300. Similarly, another row of ground shield members 332 are located along the opposite side of the upper surface of the elongate member 300. The sets of ground shield members 330 and 332 extend in different directions from the elongate member 300.

Figure 7:
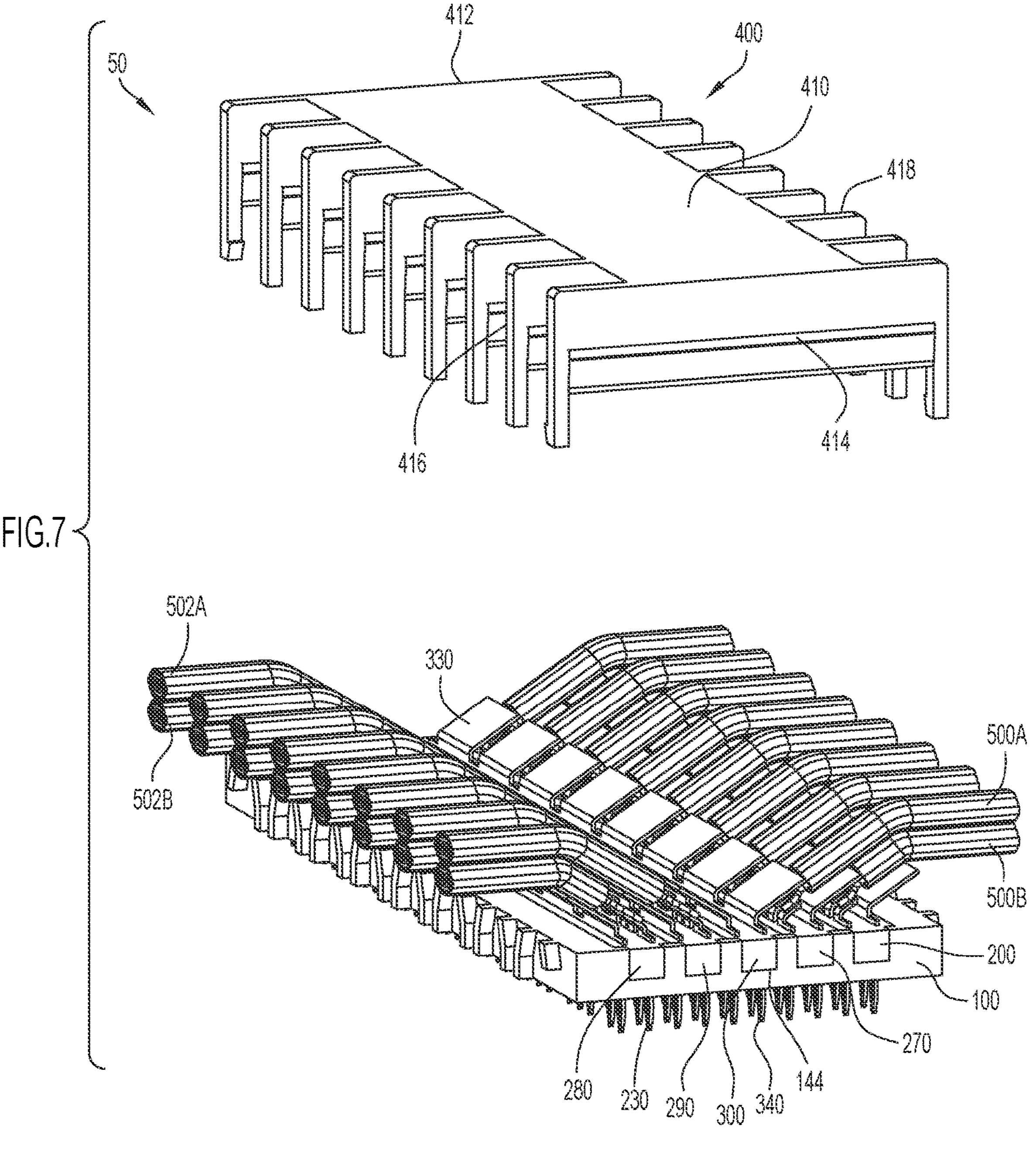
FIG. 7 is a partially exploded perspective view of the cable termination connection assembly illustrated in FIG. 4 with some components coupled together implementing the disclosed techniques, according to an example embodiment.

Turning to FIG. 7, additional components of the cable termination connection assembly 50 are assembled in this perspective view. In this configuration, the elongate member 300 is inserted into groove 144, and the downwardly extending pins 340 extend below the lower surface of the base 100. In this position, the ground shield members 330 are located over the connections of cables 500A to the signal contact member 270. Similarly, the ground shield members 332 are located over the connections of cables 502A to the signal contact member 290.

The cover 400 includes main body 410 with an upper surface 412 and an opposite lower surface 414, and a pair of opposite sides 416 and 418. Each of the side portions 420 with extending portions 422 and 428, discussed in detail above, is located on one of the opposite sides 416 and 418 of the cover main body 410.

Figure 8:
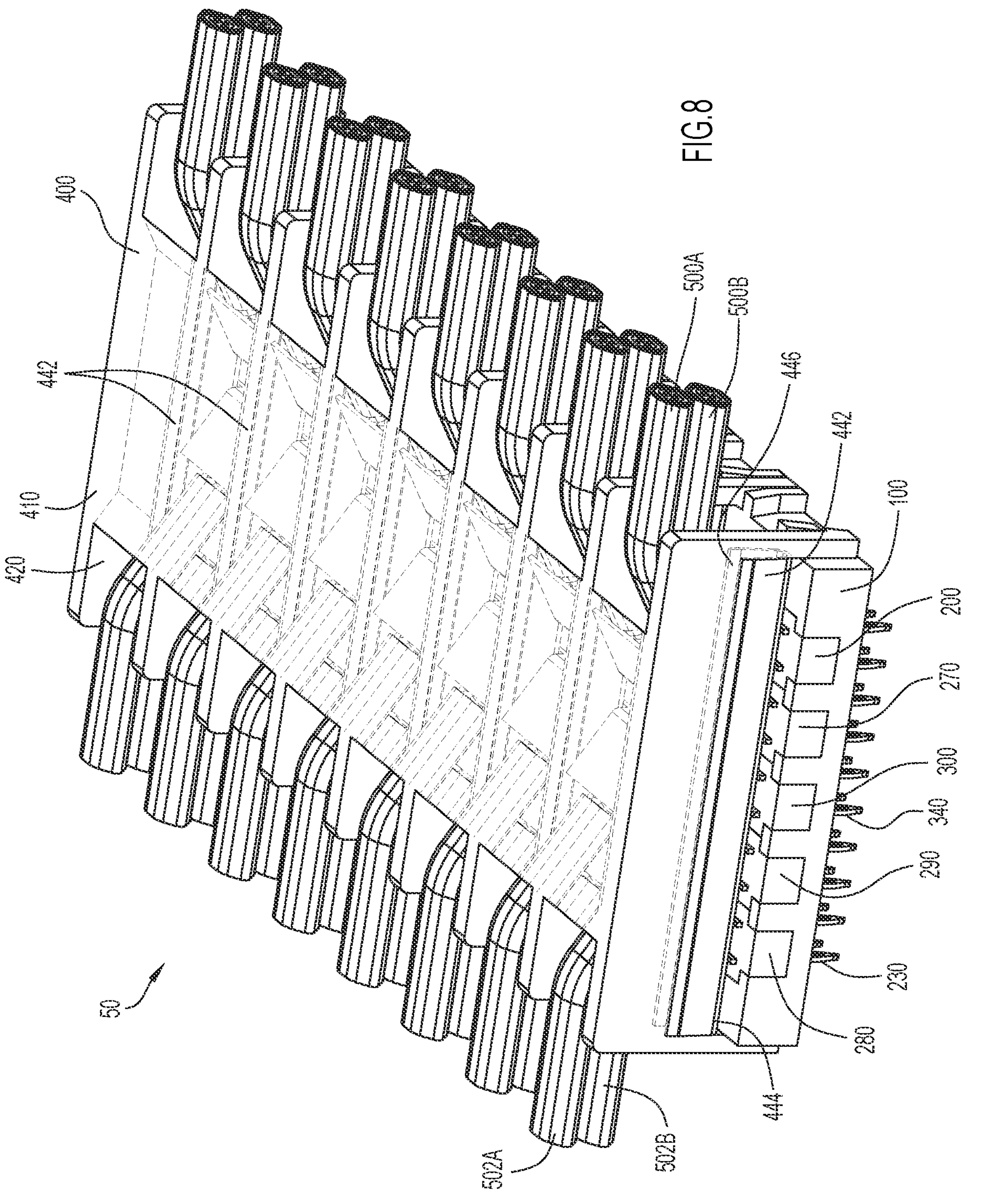
FIG. 8 is a perspective view of a fully assembled cable termination connection assembly illustrated in FIG. 4 with some components of the cover being transparent, according to an example embodiment.

Turning to FIG. 8, a perspective view of the fully assembled cable termination connection assembly 50 is illustrated. In FIG. 8, the cover 400 is illustrated as being transparent to simply the viewing of the other components of the termination connection assembly 50. The spaced apart engaging members 442 are located between different sets of cables 502A and 502B and of cables 500A and 500B. The engaging members 442 extend from one side of the cover 400 to the other side of the cover 400. The spaced apart location of the engaging members 442 result in a consistent force being applied to the signal contact members 200, 270, 280, and 290, and to the elongate member 300, thereby pressing them into engagement with the grooves in the base 100. A force can be applied to the cover 400 directly by a user or via a press-fit tool.

Figure 9:
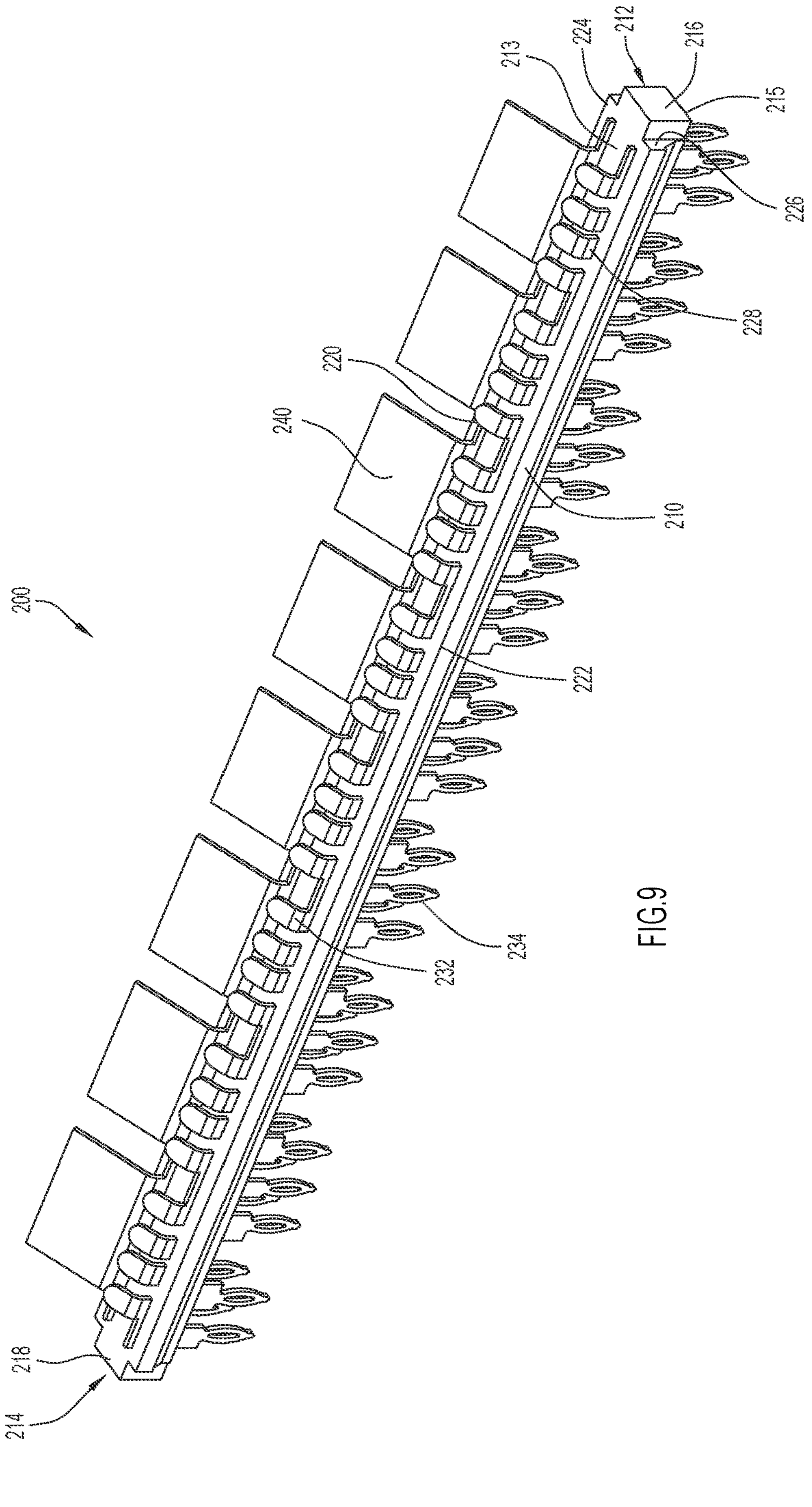
FIG. 9 is a perspective view of an example of a signal contact member implementing the disclosed techniques, according to an example embodiment.

Referring to FIG. 9, a perspective view of an example embodiment of a signal contact member implementing the disclosed techniques is shown. Signal contact member 200 includes a body 210 with an upper surface 213 and an opposite lower surface 215. The body 210 also includes opposite ends 212 and 214 and with opposite sides 220 and 222. The ends 212 and 214 have smaller projecting or protruding portions 216 and 218, respectively. The sides 220 and 222 have widened portions 224 and 226, respectively.

When the signal contact member 200 is inserted into groove 148 of the base 100, the widened portion 224 engages a notch or groove in the outer rail 132 and the widened portion 226 engages the upper edge of the proximate inner rail 134. In addition, protruding portion 216 extends between the shoulder 136 of inner rail 134 and the outer edge of outer rail 132. Similarly, protruding portion 218 extends between the shoulder 136 at the opposite end of the inner rail 134 and the opposite outer edge of outer rail 132.

Formed in the body 210 are two rows of slots 228. The lower ends of the ground shield members 240 are inserted in one row of the slots 228. The signal contact member 200 has a single row of the ground shield members 240. In the other row of the slots 228 are the upper ends 232 and 234 of the different press-fit pins 230.

Figure 10:
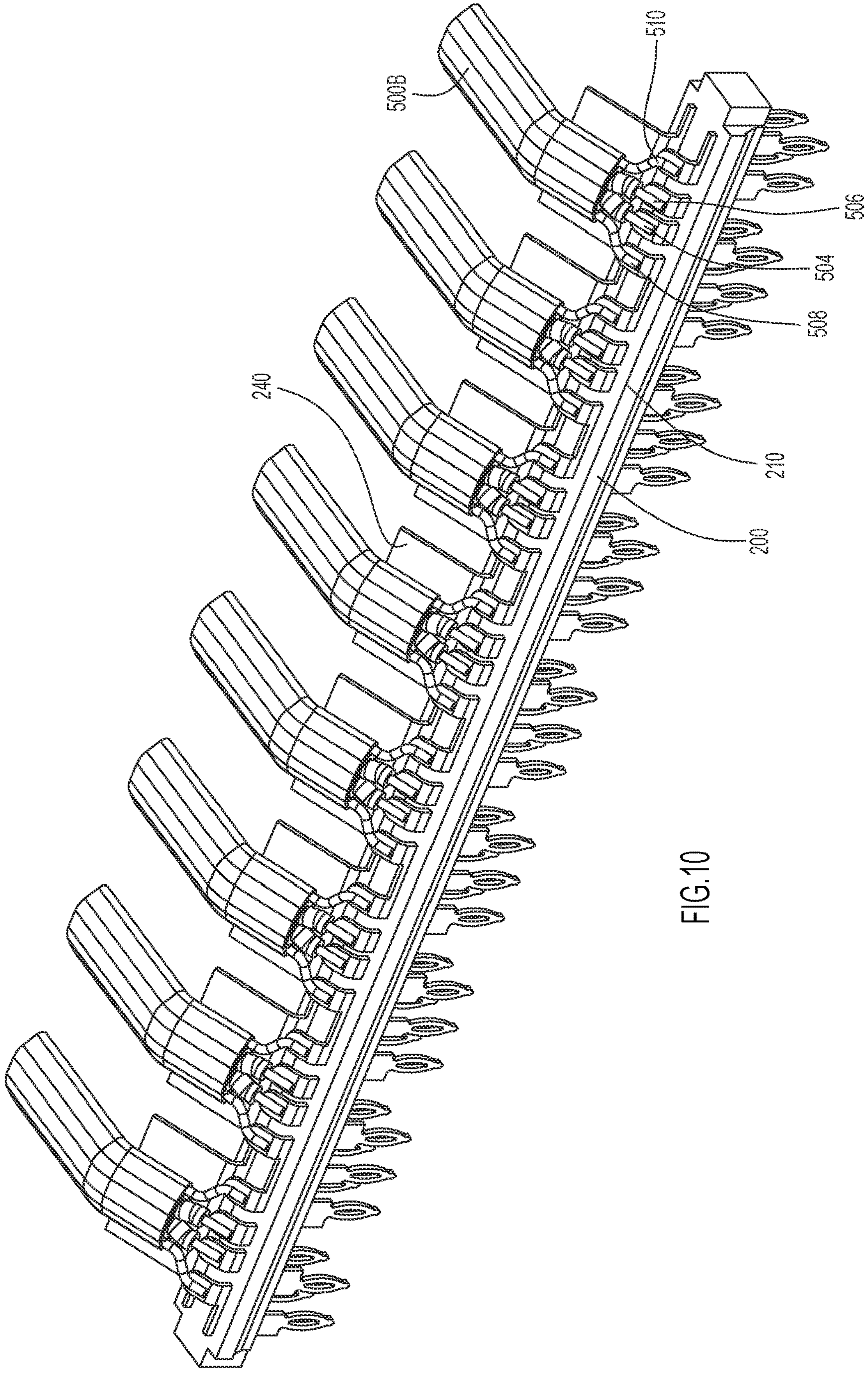
FIG. 10 is a perspective view of the signal contact member illustrated in FIG. 9 with cable terminations coupled thereto, according to an example embodiment.

Turning to FIG. 10, a perspective view of the signal contact member 200 is illustrated with cable terminations coupled thereto. The row of cables 500B are connected to the pins 230 coupled to the body 210 of signal contact member 200. At the end of each cable 500B is a first pair of wires 504 and 506, and a second pair of wires 508 and 510. Each of the wires 504, 506, 508, and 510 is connected to one of the pins 230 using any known manner or any known technique.

Figure 11:
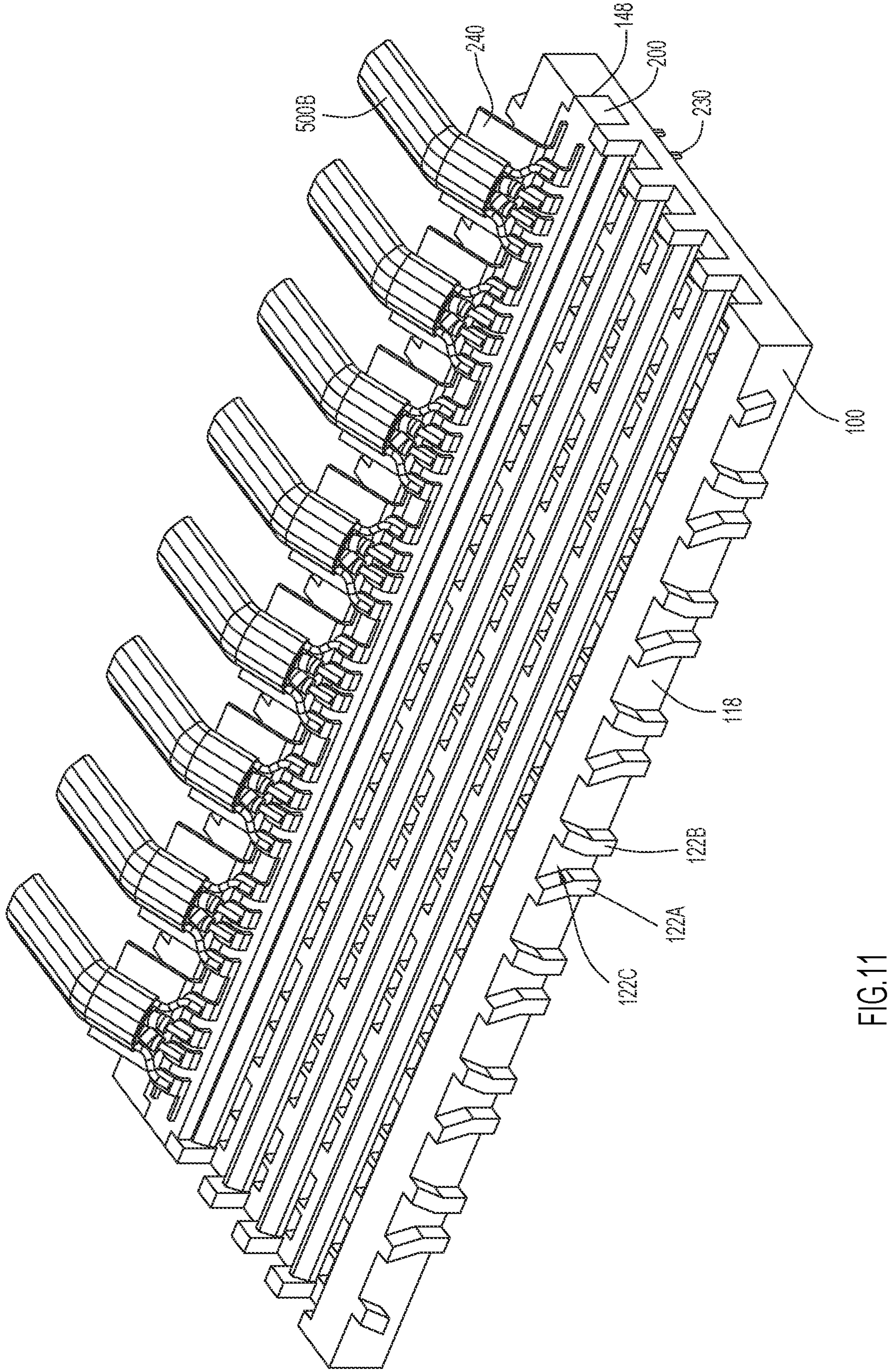
FIG. 11 is a perspective view of an example of a base with a signal contact member coupled thereto, according to an example embodiment.

Referring to FIG. 11, a perspective view of the base 100 with signal contact member 200 coupled thereto is illustrated. The signal contact member 200 is inserted into groove 148. A ground shield member 240 is located beneath each cable 500B and its connection to the sets of pins of the signal contact member 200.

The outer side surface 118 of the base 100 is shown in FIG. 11. Outer side surface 118 includes several sets of guides or rail guides 122A and 122B, which are separated from each other by a space 122C. Each set of guides 122A and 122B receives a downwardly extending portion of cover 400 in the space 122C therebetween.

Figure 12:
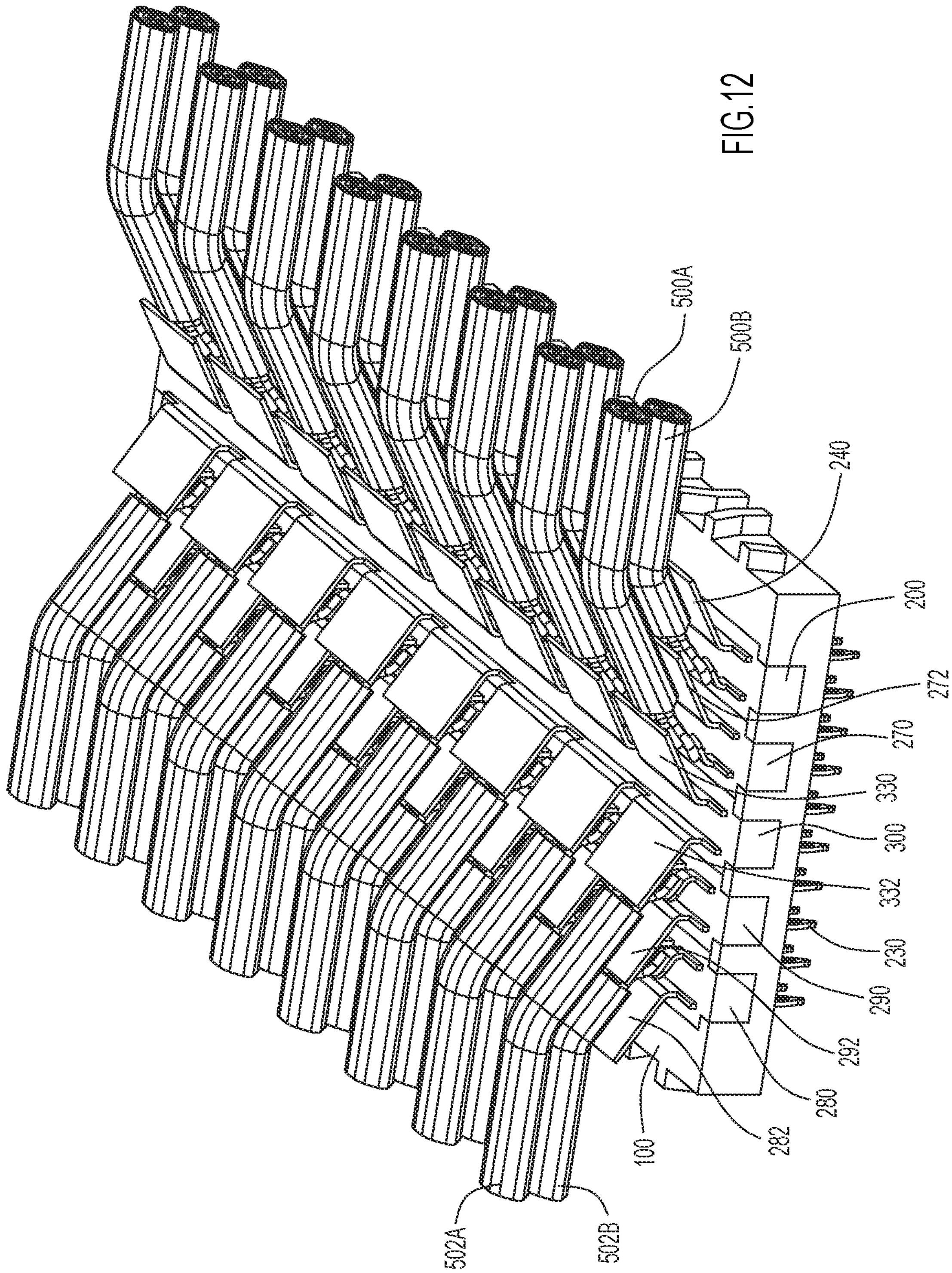
FIG. 12 is a perspective view of an example of a base with multiple signal contact members and an elongate member coupled thereto, according to an example embodiment.

Turning to FIG. 12, a perspective view of the base 100 with multiple signal contact members and an elongate member coupled thereto is illustrated. The row of ground shield members 240 coupled to signal contact member 200 are shown beneath or below the row of terminations of cables 500B. Similarly, signal contact member 270 includes a row of ground shield members 272 coupled thereto, that are located between the row of terminations of cables 500A and the row of terminations of cables 500B.

On the other side of the termination connection assembly 50 is signal contact member 280, which includes a row of ground shield members 282 coupled thereto. The ground shield members 282 are located beneath or below the row of termination cables 502B. Similarly, signal contact member 290 includes a row of ground shield members 292 coupled thereto. The ground shield members 292 are located between the row of terminations of cables 502A and the row of terminations of cables 502B.

In addition, the elongate member 300 is centrally located along the body 110. The two opposing ground shield members 330 and 332 coupled to the elongate member 300 are proximate to the terminations of cable 502A and to the terminations of cable 500A, respectively. As shown in FIG. 12, rows of ground shield members are located between adjacent rows of cable terminations. When fully assembled, the ground shield members fully encircle the differential pair wire terminations, thereby improving signal integrity and reducing signal interference.

In summary, the advantages of the disclosed cable termination connection assemblies according to the disclosed techniques include: the ability to press on top of a cable termination area for installation; a reduction in the overall size and height of the termination connection assembly; and increase in the quantity of differential pairs that can be plugged into a PCB. Other additional advantages include: ground shield row tabs and U-shaped channels that collectively surround the cable termination area; U-shaped channel bars that eliminate crosstalk resonance by connecting a ground across the signal rows; enabling twin-ax wires to exit the cable termination connection assembly in two opposite directions; facilitating repair and re-use of materials and components due to the modular nature of the assembly.

Accordingly, in some aspects, the techniques described herein relate to an apparatus including: a wire or cable termination connection assembly, comprising: a base including a body defining a groove therein; a signal contact member that is engageable with the base, at least a portion of the signal contact member being insertable into the groove of the body of the base, the signal contact member including pins extending therefrom; and a cover that is engageable with the signal contact member, wherein the cover can be pressed by a user to cause the pins to extend through the base and engage a PCB.

In some aspects, the techniques described herein relate to an apparatus, wherein the pins of the signal contact member are press-fit pins, and the signal contact member includes cable terminations with a ground shield member extending proximate to the cable terminations.

In some aspects, the techniques described herein relate to an apparatus, wherein the cover has at least one engaging surface, the at least one engaging surface engaging the signal contact member so that a force applied to the cover press-fits the pins into the PCB without damaging any cables or cable terminations.

In some aspects, the techniques described herein relate to an apparatus, wherein the cover includes several U-shaped channel bars, and each of the U-shaped channel bars including one of the at least one engaging surface of the cover.

In some aspects, the techniques described herein relate to an apparatus, wherein the signal contact member is a first signal contact member, and the PCB connector assembly further comprises: a second signal contact member, wherein the U-shaped channel bars eliminate crosstalk resonance by connecting a ground across the first signal contact member and the second signal contact member.

In some aspects, the techniques described herein relate to an apparatus, wherein the U-shaped channel bars engage the first signal contact member and the second signal contact member so that a downward force is applied to the cover is in turn applied to the first signal contact member and the second signal contact member.

In some aspects, the techniques described herein relate to an apparatus, wherein wires or cables exit the first signal contact member and the second signal contact member in opposite directions.

In some aspects, the techniques described herein relate to an apparatus, further comprising: an elongate member that is coupleable to the base, wherein the elongate member includes a first set of ground shield members and a second set of ground shield members, and the first set of ground shield members oppose the second set of ground shield members.

In some aspects, the techniques described herein relate to an apparatus including: a cable termination connection assembly, comprising: a base including a body, the body defining a first groove and a second groove; a first signal contact member engageable with the base, the first signal contact member being insertable into the first groove of the body of the base, the first signal contact member including pins extending therefrom; a second signal contact member engageable with the base, the second signal contact member being insertable into the second groove of the body of the base, the second signal contact member including pins extending therefrom; and a cover having a first engaging surface and a second engaging surface spaced apart from the first engaging surface, each of the first engaging surface and the second engaging surface being engageable with the first signal contact member and the second signal contact member, wherein the cover can be pressed by a user to move the first signal contact member and the second signal contact member into engagement with the base.

In some aspects, the techniques described herein relate to an apparatus, wherein the body of the base includes openings formed therein, and each of the pins of the first signal contact member and the pins of the second signal contact member extends through one of the openings in the body of the base and engages a PCB.

In some aspects, the techniques described herein relate to an apparatus, wherein the pins of the first signal contact member and the pins of the second signal contact member are press-fit pins, and each of the first signal contact member and the second signal contact member includes cable terminations with a ground shield member extending proximate to its cable terminations.

In some aspects, the techniques described herein relate to an apparatus, wherein the cover includes a first U-shaped channel bar and a second U-shaped channel bar, the first U-shaped channel bar having the first engaging surface, and the second U-shaped channel bar having the second engaging surface.

In some aspects, the techniques described herein relate to an apparatus, wherein the first engaging surface and the second engaging surface eliminate crosstalk resonance by connecting a ground across the first signal contact member and the second signal contact member.

In some aspects, the techniques described herein relate to an apparatus, wherein the first signal contact member has a first set of wires or cables extending therefrom in a first direction, the second signal contact member has a second set of wires or cables extending therefrom in a second direction, and the second direction is opposite to the first direction.

In some aspects, the techniques described herein relate to an apparatus, wherein the body of the base defines a third groove, the PCB connector assembly further comprising: an elongate member that is coupleable to the base, the elongate member being insertable into the third groove of the body of the base, wherein the elongate member includes a first set of ground shield members and a second set of ground shield members, and the first set of ground shield members oppose the second set of ground shield members.

In some aspects, the techniques described herein relate to an apparatus, wherein the cover includes a first U-shaped channel bar having the first engaging surface, and a second U-shaped channel bar having the second engaging surface, and each of the first engaging surface and the second engaging surface engages the first signal contact member, the second signal contact member, and the elongate member.

In some aspects, the techniques described herein relate to an apparatus including: a cable termination connection assembly, comprising: a base including a body defining a plurality of grooves; a plurality of signal contact members engageable with the base, each signal contact member being insertable into one of the grooves of the body of the base, each signal contact member including pins extending therefrom; an elongate member engageable with the base, the elongate member being insertable into of the grooves of the body of the base, the elongate member includes a plurality of ground shield members coupled thereto; and a cover having a plurality of engaging surfaces, each of the engaging surfaces being engageable with the signal contact members and with the elongate member, wherein a force applied by a user to the cover moves the signal contact members and the elongate member toward the base so that the pins engage a PCB.

In some aspects, the techniques described herein relate to an apparatus, wherein the pins of each of the signal contact members are press-fit pins, and each of the signal contact members includes cable or wire terminations with a ground shield member extending proximate to its cable or wire terminations.

In some aspects, the techniques described herein relate to an apparatus, wherein the cover includes: a first elongate member including one of the plurality of engaging surfaces; and a second elongate member including another one of the plurality of engaging surfaces, wherein each of the first elongate member and the second elongate member engages the signal contact members and the elongate member.

In some aspects, the techniques described herein relate to an apparatus, wherein one of the plurality of signal contact members has a first set of wires or cables extending therefrom in a first direction, and another one of the plurality of signal contact members has a second set of cables or wires extending therefrom in a second direction, the second direction being opposite to the first direction.

VARIATIONS AND IMPLEMENTATIONS

Note that in this Specification, references to various features (e.g., elements, structures, nodes, modules, components, engines, logic, steps, operations, functions, characteristics, etc.) included in "one embodiment," "example embodiment," "an embodiment," "another embodiment." "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of," "one or more of," "and/or," variations thereof, or the like are open-ended expressions that are both conjunctive and disjunctive in operation for any and all possible combination of the associated listed items. For example, each of the expressions "at least one of X, Y and Z." "at least one of X, Y or Z." "one or more of X, Y and Z." "one or more of X, Y or Z" and "X. Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms "first," "second," "third," etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A cable termination connection assembly, comprising:

a base including a body defining a groove therein;

a signal contact member that is engageable with the base, at least a portion of the signal contact member being insertable into the groove of the body of the base, the signal contact member including pins extending therefrom;

an elongate member coupled to the base, the elongate member including a first set of ground shield members and a second set of ground shield members, the first set of ground shield members opposing the second set of ground shield members; and a cover that is engageable with the signal contact member, wherein the cover can be pressed by a user to cause the pins to extend through the base and engage a printed circuit board (PCB).

2. The cable termination connection assembly of claim 1, wherein the pins of the signal contact member are press-fit pins, and the signal contact member includes cable terminations with a ground shield member extending proximate to the cable terminations.

3. The cable termination connection assembly of claim 1, wherein the cover has at least one engaging surface, the at least one engaging surface engaging the signal contact member so that a force applied to the cover press-fits the pins into the PCB without damaging any cables or cable terminations.

4. The cable termination connection assembly of claim 3, wherein the cover includes several U-shaped channel bars, and each of the U-shaped channel bars including one of the at least one engaging surface of the cover.

5. The cable termination connection assembly of claim 4, wherein the signal contact member is a first signal contact member, and the cable termination connection assembly further comprises:

a second signal contact member, wherein the U-shaped channel bars eliminate crosstalk resonance by connecting a ground across the first signal contact member and the second signal contact member.

6. The cable termination connection assembly of claim 5, wherein the U-shaped channel bars engage the first signal contact member and the second signal contact member so that a downward force applied to the cover is in turn applied to the first signal contact member and the second signal contact member.

7. The cable termination connection assembly of claim 5, wherein cables exit the first signal contact member and the second signal contact member in opposite directions.

8. The cable termination connection assembly of claim 1, wherein the cover includes at least one channel bar having an engaging surface, the engaging surface contacting the signal contact member to press-fit the pins into the PCB without damaging any cables or cable terminations.

9. A cable termination connection assembly, comprising:

a base including a body, the body defining a first groove and a second groove;

a first signal contact member engageable with the base, the first signal contact member being insertable into the first groove of the body of the base, the first signal contact member including pins extending therefrom;

a second signal contact member engageable with the base, the second signal contact member being insertable into the second groove of the body of the base, the second signal contact member including pins extending therefrom; and a cover having a first engaging surface and a second engaging surface spaced apart from the first engaging surface, each of the first engaging surface and the second engaging surface being engageable with the first signal contact member and the second signal contact member, wherein the cover can be pressed by a user to move the first signal contact member and the second signal contact member into engagement with the base.

10. The cable termination connection assembly of claim 9, wherein the body of the base includes openings formed therein, and each of the pins of the first signal contact member and the pins of the second signal contact member extends through one of the openings in the body of the base and engages a PCB.

11. The cable termination connection assembly of claim 9, wherein the pins of the first signal contact member and the pins of the second signal contact member are press-fit pins, and each of the first signal contact member and the second signal contact member includes cable terminations with a ground shield member extending proximate to its cable terminations.

12. The cable termination connection assembly of claim 9, wherein the cover includes a first U-shaped channel bar and a second U-shaped channel bar, the first U-shaped channel bar having the first engaging surface, and the second U-shaped channel bar having the second engaging surface.

13. The cable termination connection assembly of claim 9, wherein the first engaging surface and the second engaging surface eliminate crosstalk resonance by connecting a ground across the first signal contact member and the second signal contact member.

14. The cable termination connection assembly of claim 9, wherein the first signal contact member has a first set of cables extending therefrom in a first direction, the second signal contact member has a second set of cables extending therefrom in a second direction, and the second direction is opposite to the first direction.

15. The cable termination connection assembly of claim 9, wherein the body of the base defines a third groove, the cable termination connection assembly further comprising:

an elongate member that is coupleable to the base, the elongate member being insertable into the third groove of the body of the base, wherein the elongate member includes a first set of ground shield members and a second set of ground shield members, and the first set of ground shield members oppose the second set of ground shield members.

16. The cable termination connection assembly of claim 15, wherein the cover includes a first U-shaped channel bar having the first engaging surface, and a second U-shaped channel bar having the second engaging surface, and each of the first engaging surface and the second engaging surface engages the first signal contact member, the second signal contact member, and the elongate member.

17. A cable termination connection assembly, comprising:

a base including a body defining a plurality of grooves;

a plurality of signal contact members engageable with the base, each signal contact member being insertable into one of the plurality of grooves of the body of the base, each signal contact member including pins extending therefrom;

an elongate member engageable with the base, the elongate member being insertable into of the plurality of grooves of the body of the base, the elongate member includes a plurality of ground shield members coupled thereto; and a cover having a plurality of engaging surfaces, each of the plurality of engaging surfaces being engageable with the plurality of signal contact members and with the elongate member, wherein a force applied by a user to the cover moves the plurality of signal contact members and the elongate member toward the base so that the pins engage a printed circuit board (PCB).

18. The cable termination connection assembly of claim 17, wherein the pins of each of the plurality of signal contact members are press-fit pins, and each of the plurality of signal contact members includes cable terminations with a ground shield member extending proximate to its cable terminations.

19. The cable termination connection assembly of claim 17, wherein the cover includes:

a first elongate member including one of the plurality of engaging surfaces; and a second elongate member including another one of the plurality of engaging surfaces, wherein each of the first elongate member and the second elongate member engages the plurality of signal contact members and the elongate member.

20. The cable termination connection assembly of claim 17, wherein one of the plurality of signal contact members has a first set of cables extending therefrom in a first direction, and another one of the plurality of signal contact members has a second set of cables extending therefrom in a second direction, the second direction being opposite to the first direction.

* * * * *